United States Patent [19]

Strobel et al.

[11] 3,927,142
[45] Dec. 16, 1975

[54] PROCESS FOR THE PREPARATION IMPACT RESISTANT STYRENE POLYMERS

[75] Inventors: Wolfgang Strobel, Hofheim, Taunus; Ottokar Jaenicke, Schafbruck, Saar; Horst-Dieter Schüddemage, Weilbach, Taunus; Horst Jastrow, Niederhochstadt, all of Germany

[73] Assignee: Hoechst Aktiengesellschaft, Frankfurt am Main, Germany

[22] Filed: Dec. 19, 1973

[21] Appl. No.: 425,974

[30] Foreign Application Priority Data

Dec. 21, 1972 Germany.............................. 2262610

[52] U.S. Cl............................................. 260/878 R
[51] Int. Cl.² .................. C08L 23/16; C08F 255/06
[58] Field of Search ................................ 260/878 R

[56] References Cited
UNITED STATES PATENTS

| | | | |
|---|---|---|---|
| 3,461,188 | 8/1969 | Baer................................. | 260/878 R |
| 3,483,273 | 12/1969 | Prucnal et al.................... | 260/878 R |
| 3,489,822 | 1/1970 | Witt et al......................... | 260/878 R |
| 3,538,190 | 11/1970 | Meredith et al. ................ | 260/878 R |
| 3,538,191 | 11/1970 | Meredith et al. ................ | 260/878 R |
| 3,538,192 | 11/1970 | Bishop, Sr....................... | 260/878 R |
| 3,538,193 | 11/1970 | Meredith.......................... | 260/878 R |
| 3,639,511 | 2/1972 | Kreibich........................... | 260/878 R |
| 3,642,950 | 2/1972 | O'Shea............................. | 260/880 R |
| 3,657,395 | 4/1972 | Meredith et al. ................ | 260/878 R |
| 3,683,050 | 8/1972 | Meredith et al. ................ | 260/878 R |
| 3,694,522 | 9/1972 | Tsuruta et al.................... | 260/878 R |
| 3,719,731 | 3/1973 | Schuster et al. ................ | 260/878 R |

*Primary Examiner*—Alan Holler
*Attorney, Agent, or Firm*—Curtis, Morris & Safford

[57] ABSTRACT

An improved polymer and a process for the preparation of impact resistant styrene graft copolymers. Ethylene-propylene-tercomponent-rubber is dissolved in styrene, then acrylonitrile is added to a styrene to acrylo-nitrile ratio of 6/1 to 4/1, the polymerization is carried out in the mass until the end of the phase transition, further acrylonitrile, and optionally further styrene, is added and the polymerization is completed in the mass or in suspension.

7 Claims, No Drawings

PROCESS FOR THE PREPARATION IMPACT RESISTANT STYRENE POLYMERS

The present invention concerns a process for the preparation of impact resistant styrene polymers.

It is known that products with considerably improved weathering stability are obtained by using an amorphous polyolefin instead of rubber for the preparation of impact resistant polystyrene. It is essential that the polyolefin contains no carbon double bonds in the main chain, such as, for example, the ethylene-propylene-tercomponent rubbers.

The non-polar ethylene-propylene-tercomponent-rubbers are easily soluble in non-polar monomers, such as styrene or α-methylstyrene, but become insoluble when polar monomers are added, such as acrylo-nitrile, and precipitate macroscopically. Up to now two processes have been made known to overcome this difficulty:

1. By adding non-polar hydrocarbons as solvents the ethylene-propylene-tercomponent-rubber is kept in a dissolved state, in spite of the presence of acrylonitrile.
2. By adding separately prepared graft copolymers of styrene-acrylonitrile on ethylene-propylene-tercomponent rubber, which act as oil-in-oil emulsifiers, the ethylene-propylene-tercomponent-rubber, after dissolving in styrene, is dispersed microscopically in the solution with the addition of acrylonitrile and a macroscopic precipitation is prevented.

A process has now been found for the preparation of impact resistant styrene graft copolymers by polymerization of a. 98 to 80 percent by weight of a mixture of
  aa. 90 to 70, preferably 80 to 70,70, by weight of styrene and/or at least one styrene derivative with
  ab. 10 to 30, preferably 20 to 30, percent by weight of acrylo-nitrile and/or at least one other derivative of acrylic acid
in admixture with
b. 2 to 20 percent by weight of an ethylene-propylene-tercomponent-rubber,
  (aa) and (ab) being calculated on the total quantity of the monomers (aa) + (ab) and (a) and (b) on the total quantity of monomers (a) [(=aa) + (ab)] + (rubber b), in the presence of at least one organic peroxide, soluble in the monomers, and optionally in the presence of at least one molecular weight regulator in the mass or in mass/suspension, wherein the mixture is polymerized after dissolving the ethylene-propylene-tercomponent-rubber in styrene and/or styrene derivative(s) (aa) and adding acrylo-nitrile and/or acrylic acid derivative(s) (ab) up to an (aa)/(ab) ratio of 6/1 to 4/1, perferably 5.5/1 to 4.5/1, especially 5/1, at a temperature of from 85° to 115°C until the end of the phase transition, and polymerization is completed after a further addition of acrylonitrile and/or acrylic acid derivative(s) and optionally styrene and/or styrene derivative(s) up to the desired ratio of (aa) to (ab).

Instead of styrene as monomer component (aa) also styrene derivatives can be used, such as α-methyl styrene or styrenes the nucleus of which is methylated, (for example o- or p-vinyltoluene or vinylxylenes) or styrenes the nucleus of which is halogenated (for example o- or p-chloro- or bromo-styrene) or vinylcyclohexane or methylated or halogenated derivatives of vinylcyclohexane, or mixtures of styrene and one or more derivatives of styrene or mixtures of two or more derivatives of styrene, preferably mixtures of 95 to 60 percent by weight of styrene and 5 to 40 percent by weight of α-methyl styrene, and instead of acrylonitrile as monomer component (ab) also other acrylic acid derivatives, such as methacrylonitrile or esters of acrylic acid, of methycrylic acid, of itaconic acid (=carboxymethyl-acrylic acid), or maleic acid (=carboxy-acrylic acid) or fumaric acid with low aliphatic alcohols (for example, methanol, ethanol, isopropanol, butanol, isobutanol, hexanol, octanol, isooctanol or 2-ethylhexanol), alone or in combination with one another and/or with acrylonitrile.

Mixtures of 20 to 30 percent by weight of acrylonitrile and styrene are especially advantageous on account of resistance to solvents, breaking strength, crack formation and thermostability of the final product.

Suitable ethylene-propylene-tercomponent-rubbers are those which are obtained by polymerization of 70 to 30 percent by weight of ethylene, 30 to 70 percent by weight of propylene and from 0.5 to 15 percent by weight of a diolefinic tercomponent. As tercomponent diolefins with at least 5 carbon atoms, the double bonds of which are not conjugated, are suitable, such as 5-ethylidene-norbornene, dicyclopentadiene, 2,2,1-bicyclo-heptadiene and 1,4-hexadiene.

The polymerisation is carried out in the presence of initiators soluble in the monomers, such as organic peroxides, for example di-t-butyl-peroxide, 2,5-dimethyl-2,5-di-t-butyl-peroxyhexane, t-butyl-perbenzoate, t-butyl-peracetate, di-benzoylperoxide, t-butyl-peroctoate, dilauroyl-peroxide, t-butyl-hydroperoxide, or nitrogen compounds decomposing with formation of radicals of the type of azodiisobutyronitrile. These initiators are used in the usual concentration range of from 0.05 to 1, perferably from 0.1 to 0.4, percent by weight, calculated on the total quantity of monomers and ethylene-propylene-tercomponent-rubber (EPTR).

The desired degree of polymerisation (molar weight) is adjusted by regulators commonly used in the styrene polymerisation, such as dimers of styrene or of α-methylstyrene in a concentration range of 0.1 to 1 percent by weight, or mercaptans such as n-dodecylmercaptan (1-dodecanethiol) or t-dodecylmercaptan, commercially available mostly as isomer mixture of approximately 70 percent by weight 2,4,4,6,6- and approximately 30 percent by weight 2,2,4,6,6-pentamethylheptanethiol) in a concentration of from 0.005 to 0.15 percent by weight, calculated on the total quantity of monomers and EPTR.

The polymerisation initiators as well as also the molar weight regulators can be added together or one after another in measured parts during the pre- polymerisation (1st stage) and/or the subsequent polymerisation stage(s), in the same measure as the polymerisation progresses.

According to the process of the invention polymerisation can be carried out in the mass as well as in the mass/suspension. In both cases the EPTR is dissolved first in the non-polar monomer(s) (aa) containing only carbon and hydrogen, for example styrene. Also the usual non polar additives, for example white oils (mixtures of aliphatic hydrocarbons in the boiling range of from 100° to 300°C) can be added. After the dissolution is complete the mixture is heated and the polar monomer(s) (ab) containing nitrogen or oxygen are added. Time and duration of the addition are variable within a wide range. In each case the above process ensures that a homogenous solution of the EPTR in the monomer mixture is present when a certain temperature has been reached (it is dependent on the monomer ratio of the nonpolar and polar monomers and is, for example, 85°C at a styrene/acrylo-nitrile-ratio of 5/1.

The subsequent pre- polymerisation (1st stage) is carried out in the mass while stirring until after the phase transition has taken place. By adding the above named monomer soluble initiators and regulators the grafting of the monomers on the EPTR and the viscosity of the polystyrene-acrylonitrile phase can be influenced. Both additives influence in known way, in connection with type and intensity of the stirring, the rubber morphology. After the phase transition has taken place the portion of the polar monomer(s) can be increased further without decisive alteration of the rubber morphology (i.e. without the EPTR precipitating macroscopically). The 2nd stage following the pre-polymerization in which the polymerization is concluded should be carried out without further alteration of the rubber morphology adjusted in the pre-polymerization. The further polymerization can take place in known way either after suspension in water as suspension polymerization or also in (a) further polymerization vessel(s) in the mass. The suspension polymerization does not differ in its nature from the polymerization in the mass; the distribution of the pre-polymer in water serves alone to eliminate more easily the reaction heat arising with the polymerization. The difference lies rather in the fact that the mass/suspension polymerization (1st stage = mass polymerization, 2nd stage = suspension polymerization) is carried out generally discontinuously, the mass/mass polymerization (1st stage and 2nd stage in each case mass polymerization) on the other hand is carried out continuously, which does not influence compulsorily the properties of the products obtained.

The suspension polymerization is carried out in the presence of known suspension stabilizers such as water-soluble-cellulose ethers, gelatine, polyvinyl alcohol, partly saponified polyvinyl acetate (for example with a remaining-acetyl-content of from 1 to 20 percent by weight and a viscosity of the 4 percent by weight aqueous solution at 20°C from 20 to 50 centipoises) or tricalcium phosphate in concentrations of 0.05 to 0.5 percent by weight, calculated on the total quantity of monomers and EPTR.

The advantage of the process of the invention is that the additional process steps necessary in the known processes named at the beginning, such as the elimination of the solvent or the separate preparation of graft copolymers are not required. By a styrene/acrylonitrile ratio of 6/1 to 4/1, perferably 5.5/1 to 4.5/1, especially 5/1, at the beginning of the polymerization, at temperatures of 85° to 115°C, a homogeneous solution of the ethylene-propylene-tercomponent-rubber is obtained: an addition of solvent is not necessary. On the other hand, very favourable grafting conditions result with this process when organic peroxides are used: an addition of separately prepared graft copolymers of styrene-acrylonitrile on ethylene-propylene-tercomponent rubber (EPTR) is not necessary either. After the conclusion of the phase transition any styrene/acrylonitrile ratio can be set by further acrylonitrile addition. In so doing the morphology of the disperse, internal rubber phase is not altered.

The following examples illustrate the invention. The EPTR used contained approximately 6 ethylidene-norbornene units for 1,000 carbon atoms (corresponding to 5 percent by weight ethylidene-norbornene), approximately 50 percent by weight of propylene and had a mean molecular weight $M_w$ of approximately 200,000.

EXAMPLE 1

In a polymerization apparatus, consisting of a 20 l autoclave (I) for the mass pre- polymerization and a 40 l autoclave (II) for the suspension polymerization 1,000 g of EPTR were dissolved while stirring in 5,600 g of styrene for 8 hours in autoclave I. The solution was heated to 90°C and a mixture of 500 g of styrene, 1,200 g of acrylonitrile and 11 g of t-butylperbenzoate were added from a storagetank for approximately 5 minutes so that the styrene/acrylonitrile ratio was 5/1. The mixture was prepolymerized for 2.5 hours while stirring. After cooling to 80°C a mixture of 650 g of styrene, 850 g of acrylo-nitrile, 20 g of t-butyl-perbenzoate, 1 g of di-t-butyl-peroxide and 40 g of dimeric α-methylstyrene were added quickly, so that the styrene/ acrylonitrile ratio was now 3/1 in the polymerization batch. After a mixing time of 10 minutes the batch was drawn off into the suspension polymerization autoclave containing a solution of 40 g of partly saponified polyvinyl acetate (with 12% remaining acetyl content and a viscosity of the 4 percent by weight aqueous solution at 20°C of approximately 40 centipoises) in 15 l of distilled water. The mixture was dispersed for half an hour at 90°C; subsequently the mixture was polymerized for three hours at 114°C and for a further 3 hours at 135°C. By injection moulding at 240°C test bars were prepared according to DIN 53 435. The following values were obtained:

| | |
|---|---|
| notched impact strength at 0°C (according to DIN 53453) | 7.5 kgcm/cm² |
| impact strength at 23°C (according to DIN 53453) | 81 kgcm/cm² |
| ball indentation hardness (30 sec.) (according to DIN 53456) | 1050 kg/cm² |
| Vicat softening point (according to DIN 53460) | 98°C |

EXAMPLE 2

In the same apparatus and in the same way as in Example 1 a solution of 1,000 g of EPTR in 5,600 g of styrene was prepared in the autoclave I. After heating to 90°C a mixture of 1,150 g of styrene, 1,040 g of acrylonitrile and 11 g of t-butyl-perbenzoate was added during approximately 5 minutes, so that the styrene/acrylonitrile ratio was 6.5/1. The mixture was prepolymerized while stirring for 2 ½ hours. After cooling to 80°C a mixture of 1,010 g of acrylonitrile, 20 g of t-butylperbenzoate, 1 g di-t-butyl-peroxide, and 40 g of dimeric α-methyl styrene was added quickly so that the styrene/acrylonitrile ratio was 3/1 in the polymerization batch. The polymerization was continued as in Example 1. The following test values were obtained:

| | |
|---|---|
| notched impact strength at 0°C | 2.9 kgcm/cm² |
| impact strength at 23°C | 34 kgcm/cm² |
| ball indentation hardness (30 sec.) | 1050 kg/cm² |

-continued

Vicat softening point     99°C

EXAMPLE 3

In the same apparatus as in Example 1 a solution of 1,350 g of EPTR, and 270 g of white oil (boiling range 120° to 280°C) was prepared in 8,400 g of styrene during 8 hours in the autoclave I. After heating to 90°C a mixture of 600 g of styrene, 1,800 g of acrylonitrile and 21 g of t-butyl-perbenzoate was added during 5 minutes so that the styrene/acrylonitrile ratio was 5/1. The mixture was prepolymerized for 2 hours while stirring. After cooling to 80°C, 900 g of acrylonitrile and 35 g of t-butyl-peroctoate were added quickly so that the styrene/acrylonitrile ratio was 3/1. After a mixing time of 10 minutes the batch was transferred into autoclave II containing, a solution of 44 g of partly saponified polyvinyl acetate (with approximately 12% of remaining acetyl content and a viscosity of the 4 percent by weight aqueous solution at 20°C of approximately 40 centipoises) in 16 l of water. The mixture was dispersed for half an hour at 80°C; subsequently the polymerization was continued for 5 hours at 90°C and for a further 3 hours at 135°C. The following values were obtained:

| | |
|---|---|
| notched impact strength at 0°C | 13 kgcm/cm$^2$ |
| impact strength at 23°C | 94 kgcm/cm$^2$ |
| ball indentation hardness (30 sec.) | 1130 kg/cm$^2$ |
| Vicat softening point | 97°C |

EXAMPLE 4

In the same apparatus and using the same method as in Example 1 a solution of 1,000 g of EPTR was prepared in 5,600 g of styrene. The solution was heated to 90°C and a mixture of 500 g of styrene and 1,200 g of acrylonitrile was added during approximately 5 minutes, so that the styrene/acrylonitrile ratio was 5/1. The mixture was prepolymerized while stirring for 6 hours. After cooling to 80°C a mixture of 650 g of styrene, 850 g of acrylonitrile, 30 of t-butyl-perbenzoate, 1 g of di-t-butyl-peroxide and 40 g of dimeric α-methyl-styrene was added quickly so that the styrene/acrylo-nitrile-ratio in the polymerization batch was 3/1. The further process was carried out as in Example 1. The following values were obtained:

| | |
|---|---|
| notched impact strength at 0°C | 3.3 kgcm/cm$^2$ |
| impact strength at 23°C | 40 kgcm/cm$^2$ |
| ball indentation hardness (30 sec.) | 995 kg/cm$^2$ |
| Vicat softening point | 96°C |

What is claimed is:

1. Process for the preparation of impact resistant styrene graft copolymers by polymerization of
   a. 98 to 80 percent by weight of a mixture of
      aa. 90 to 70 percent by weight of at least one monomer selected from the group consisting of styrene, vinyl toluene, vinyl xylene, chloro-styrene, bromo-styrene, vinylcyclohexane, methylvinylcyclohexane and halogenvinyl cyclohexane with
      ab. 10 to 30 percent by weight of at least one monomer selected from the group consisting of acrylonitrile, methacrylonitrile, a low aliphatic alcohol ester of acrylic acid, methacrylic acid, itaconic acid, maleic acid, and fumaric acid in admixture with
   b. 2 to 20 percent by weight of an ethylenepropylene-ter-component-rubber, (aa) and (ab) being calculated, in percent by weight, on the total quantity of the monomers (aa) + (ab) and (a) and (b) on the total quantity of monomers a) [(=aa) + (ab)] + rubber (b), in the presence of at least one monomer soluble, organic peroxide in the mass or in mass/suspension, wherein the mixture of (aa) and (ab) with (b) is polymerized, after dissolving the ethylene-propylene-ter-component-rubber in at least one member of said group recited in (aa), and thereafter adding at least one member of said group recited in (ab) within an (aa) / (ab) ratio, in percent by weight, of 6/1 to 4/1 at a temperature of 85° to 115°C, until the end of the phase transition, and the polymerization is completed after a further addition of
   i. at least one monomer from the group consisting of monomers, recited in (aa) or (ab) or
   ii. a mixture of (aa) and (ab) for the polymerization mass to fall within the recited ratio of aa) to ab).

2. The process as defined in claim 1 and wherein the polymerization is completed after a further addition of at least one member of said group recited in (aa) or (ab) for the polymer to fall within the recited ratio of (aa) to (ab).

3. The process as claimed in claim 1, wherein a monomer component aa) a mixture of 95 to 60 percent by weight of styrene and 5 to 40 percent by weight of α-methylstyrene is used.

4. The process defined in claim 1, wherein as mixture (a) a mixture of
   80 to 70 percent by weight of (aa) is used with
   20 to 30 percent by weight of (ab).

5. The process as defined in claim 1, wherein the mixture is polymerized after dissolving the ethylene-propylene-tercomponent rubber in at least one member of said group recited in (aa) and adding of at least one member of said group recited in (ab) to an (aa) / (ab) ration of 5.5/1 to 4.5/1, said ratio being based on percent by weight.

6. The process as defined in claim 1, wherein the mixture is polymerized after dissolving the ethylene-propylene tercomponent rubber in at least one member of said group recited in aa) and adding of at least one member of said group recited in ab) to an (aa) / (ab) ratio of 5/1, said ratio being based on percent by weight.

7. The process as defined in claim 1, and wherein the polymerization is carried out in the presence of at least one molecular weight regulator.

\* \* \* \* \*